(12) United States Patent
Gonzalez (10) Patent No.: US 11,319,808 B2
(45) Date of Patent: May 3, 2022

(54) HOSE RETENTION SYSTEM FOR DRILLING MACHINE

(71) Applicant: Caterpillar Global Mining Equipment LLC, Denison, TX (US)

(72) Inventor: Fernando Gonzalez, Sherman, TX (US)

(73) Assignee: Caterpillar Global Mining Equipment LLC, Denison, TX (US)

(*) Notice: Subject to any disclaimer, the term of this patent is extended or adjusted under 35 U.S.C. 154(b) by 109 days.

(21) Appl. No.: 16/159,233

(22) Filed: Oct. 12, 2018

(65) Prior Publication Data

US 2020/0116020 A1 Apr. 16, 2020

(51) Int. Cl.

| | |
|---|---|
| *E21C 35/04* | (2006.01) |
| *E02F 9/22* | (2006.01) |
| *E21B 15/04* | (2006.01) |
| *E21B 19/24* | (2006.01) |
| *F16G 13/16* | (2006.01) |
| *F16L 3/01* | (2006.01) |

(Continued)

(52) U.S. Cl.
CPC .......... *E21C 35/046* (2013.01); *E02F 9/2275* (2013.01); *E21B 15/04* (2013.01); *E21B 19/24* (2013.01); *F16G 13/16* (2013.01); *F16L 3/01* (2013.01); *E21B 19/08* (2013.01); *E21B 19/155* (2013.01); *H02G 11/00* (2013.01); *H02G 11/006* (2013.01)

(58) Field of Classification Search
CPC .......... E21B 19/08; E21B 19/22; E21B 19/02; E21B 19/00; E21B 15/00; E21B 7/02; E21B 19/14; E21B 15/04; E21B 7/022; E21B 19/084; E02F 9/2275; H02G 3/0443; H02G 11/006; H02G 11/00; B66C 13/12; F16L 3/01; E21C 35/046
See application file for complete search history.

(56) References Cited

U.S. PATENT DOCUMENTS

| | | | | |
|---|---|---|---|---|
| 2,076,810 A | * | 4/1937 | Deckard | ................. E21B 19/14 |
| | | | | 182/150 |
| 2,255,241 A | * | 9/1941 | Brown | .................... E21B 7/021 |
| | | | | 173/40 |

(Continued)

FOREIGN PATENT DOCUMENTS

| | | | | |
|---|---|---|---|---|
| FR | 2576158 A1 | * | 7/1986 | ........... H02G 3/0443 |
| FR | 2599906 A1 | * | 12/1987 | ........... H02G 3/0443 |

(Continued)

*Primary Examiner* — Muhammad Ijaz
*Assistant Examiner* — Taylor L Morris
(74) *Attorney, Agent, or Firm* — Bookoff McAndrews PLLC (57) ABSTRACT

A hose retention system for a negative-angle-capable blasthole drilling machine is disclosed. The hose retention system may include an upper cage to extend longitudinally along a mast structure. The upper cage may have a secured end to couple the upper cage to the mast structure, a free end to extend toward the mast structure, and a first longitudinally-extending channel. The hose retention system may include a lower cage separate from the upper cage to extend longitudinally along the mast structure. The lower cage may have a secured end to couple the lower cage to the mast structure, a free end to extend toward the mast structure, and a second longitudinally-extending channel.

19 Claims, 5 Drawing Sheets

(51) Int. Cl.
*E21B 19/08* (2006.01)
*E21B 19/15* (2006.01)
*H02G 11/00* (2006.01)

(56) References Cited

U.S. PATENT DOCUMENTS

| | | | | |
|---|---|---|---|---|
| 2,291,055 A * | 7/1942 | Ortloff | E21B 19/14 | 182/113 |
| 2,358,755 A * | 9/1944 | Woody | E21B 19/14 | 182/82 |
| 2,570,076 A * | 10/1951 | Sims | E21B 19/14 | 182/146 |
| 2,641,703 A * | 6/1953 | Valach | H01Q 19/30 | 343/803 |
| 2,662,797 A * | 12/1953 | Moon | E21B 19/14 | 182/114 |
| 2,979,162 A * | 4/1961 | Quayle | B66F 9/08 | 187/227 |
| 3,101,816 A * | 8/1963 | Fox | E21B 7/023 | 52/118 |
| 3,162,253 A * | 12/1964 | Curtis | E21B 19/22 | 173/147 |
| 3,166,208 A * | 1/1965 | Quayle | B66F 9/205 | 414/642 |
| 3,181,630 A * | 5/1965 | Coburn | E21B 7/02 | 175/85 |
| 3,192,704 A * | 7/1965 | Macrae | B66C 13/12 | 59/78.1 |
| 3,289,869 A * | 12/1966 | Hoyt | B66F 9/205 | 414/631 |
| 3,340,938 A * | 9/1967 | Wilson | E21B 7/023 | 173/28 |
| 3,500,941 A * | 3/1970 | Rudman | E21B 7/025 | 173/160 |
| 3,551,612 A * | 12/1970 | Guentner | H02G 11/003 | 191/12 C |
| 3,612,318 A * | 10/1971 | Ramsey | B66F 9/205 | 187/228 |
| 3,630,325 A * | 12/1971 | Corl | B66C 13/12 | 191/12 C |
| 3,638,806 A * | 2/1972 | Hippach | B66C 23/703 | 212/231 |
| 3,659,661 A * | 5/1972 | Young | E21B 19/20 | 175/85 |
| 3,692,124 A * | 9/1972 | Kimber | E21B 19/081 | 173/160 |
| 3,752,180 A * | 8/1973 | Elder | H02G 11/00 | 137/355.17 |
| 3,752,229 A * | 8/1973 | Pridy | E21B 19/00 | 166/72 |
| 3,833,774 A * | 9/1974 | Mills | B66C 13/12 | 191/12 R |
| 3,885,816 A * | 5/1975 | Miller | E02F 3/653 | 280/421 |
| 3,973,634 A * | 8/1976 | Persson | B66C 13/12 | 173/147 |
| 3,978,993 A * | 9/1976 | Howard | E21B 15/02 | 414/22.55 |
| 3,994,350 A * | 11/1976 | Smith | E21B 19/084 | 175/85 |
| 3,994,373 A * | 11/1976 | Loos | F16G 13/16 | 191/12 C |
| 3,999,784 A * | 12/1976 | Kennedy, Jr. | E02F 9/2271 | 285/62 |
| 4,050,590 A * | 9/1977 | Benjamin | E21B 15/04 | 414/22.53 |
| 4,077,525 A * | 3/1978 | Callegari | E21B 19/14 | 414/22.63 |
| 4,092,997 A * | 6/1978 | Hansen | F16L 3/01 | 137/351 |
| 4,102,094 A * | 7/1978 | MacKinnon | E02D 13/04 | 173/195 |
| 4,148,367 A * | 4/1979 | Reich | E21B 7/005 | 173/215 |
| 4,157,129 A * | 6/1979 | Christopher | E04G 1/20 | 182/82 |
| 4,190,119 A | 2/1980 | Loftis et al. | | |
| 4,250,973 A * | 2/1981 | Hall | E21B 19/24 | 173/147 |
| 4,262,754 A * | 4/1981 | Nelson | E21B 3/02 | 173/196 |
| 4,265,063 A * | 5/1981 | Muller | B66C 13/12 | 137/377 |
| 4,266,744 A * | 5/1981 | Bergman | H02G 11/00 | 187/228 |
| 4,269,395 A * | 5/1981 | Newman | E21B 7/023 | 173/147 |
| 4,314,611 A * | 2/1982 | Willis | E21B 21/02 | 173/197 |
| 4,336,840 A * | 6/1982 | Bailey | E21B 19/22 | 166/77.4 |
| 4,371,041 A * | 2/1983 | Becker | E21B 19/02 | 173/28 |
| 4,393,944 A * | 7/1983 | Gugger | E21B 7/027 | 173/28 |
| 4,403,897 A * | 9/1983 | Willis | E21B 19/155 | 269/238 |
| 4,440,262 A * | 4/1984 | Hunt | B66F 11/04 | 175/85 |
| 4,444,536 A * | 4/1984 | Brown | E21B 19/00 | 254/106 |
| 4,547,109 A * | 10/1985 | Young | E21B 19/155 | 175/85 |
| 4,595,065 A * | 6/1986 | Wada | E21B 7/027 | 175/85 |
| 4,616,454 A * | 10/1986 | Ballachey | E21B 7/02 | 52/115 |
| 4,658,854 A * | 4/1987 | Hopkins | F16L 3/223 | 137/355.17 |
| 4,789,120 A * | 12/1988 | Spidel | B66F 11/046 | 182/141 |
| 4,807,432 A * | 2/1989 | Mauri | F16G 13/16 | 248/49 |
| 4,809,788 A * | 3/1989 | Nelson | E21B 7/02 | 173/28 |
| 4,830,337 A * | 5/1989 | Ichiro | B23Q 7/1431 | 254/95 |
| 4,951,759 A * | 8/1990 | Richardson | E21B 19/155 | 175/85 |
| 5,050,673 A * | 9/1991 | Baldridge | E21B 15/04 | 166/70 |
| 5,062,605 A * | 11/1991 | Muhlethaler | H02G 3/0443 | 248/243 |
| 5,076,372 A * | 12/1991 | Hellbusch | E21B 7/005 | 175/20 |
| 5,107,940 A * | 4/1992 | Berry | E21B 7/023 | 175/122 |
| 5,133,405 A * | 7/1992 | Elliston | E21B 19/22 | 166/77.3 |
| 5,257,961 A * | 11/1993 | Wehler | F16G 13/16 | 428/122 |
| 5,411,443 A * | 5/1995 | Meier | F16G 13/16 | 191/12 C |
| 5,422,157 A * | 6/1995 | Wehler | B66C 13/12 | 428/122 |
| 5,544,978 A * | 8/1996 | Albers | E02D 7/26 | 173/184 |
| 5,547,314 A * | 8/1996 | Ames | E21B 7/128 | 166/346 |
| 5,566,764 A * | 10/1996 | Elliston | E21B 19/22 | 166/385 |
| 5,570,975 A * | 11/1996 | Reinert, Sr. | E02D 7/26 | 173/184 |
| 5,649,415 A * | 7/1997 | Pea | F16G 13/16 | 191/12 C |
| 5,893,539 A * | 4/1999 | Tran | H05K 7/1491 | 248/282.1 |

(56) References Cited

U.S. PATENT DOCUMENTS

| | | | | |
|---|---|---|---|---|
| 5,902,961 | A * | 5/1999 | Viklund | H02G 3/26 174/100 |
| 5,941,324 | A * | 8/1999 | Bennett | E21B 19/14 175/85 |
| 5,944,452 | A * | 8/1999 | Reinert, Sr. | E02D 7/20 405/232 |
| 5,996,330 | A * | 12/1999 | Ehmann | F16G 13/16 59/78.1 |
| 6,019,323 | A * | 2/2000 | Jette | H02G 3/0443 248/49 |
| 6,047,771 | A * | 4/2000 | Røynestad | E21B 19/084 166/77.52 |
| 6,102,214 | A * | 8/2000 | Mendoza | H04Q 1/09 211/26 |
| 6,112,834 | A * | 9/2000 | Barrett | E21B 19/084 175/162 |
| 6,140,584 | A * | 10/2000 | Baldissara | H02G 3/045 174/68.3 |
| 6,182,773 | B1 * | 2/2001 | Borgman | E21B 7/02 175/209 |
| 6,215,069 | B1 * | 4/2001 | Martin | H02G 3/0456 174/68.3 |
| 6,352,216 | B1 * | 3/2002 | Coats | B65H 75/22 242/608.4 |
| 6,361,000 | B1 * | 3/2002 | Jette | H02G 3/0443 248/302 |
| 6,365,834 | B1 * | 4/2002 | Larsen | H02G 3/0443 174/100 |
| 6,380,484 | B1 * | 4/2002 | Theis | F16L 3/26 174/101 |
| 6,412,576 | B1 * | 7/2002 | Meiners | E21B 15/00 175/170 |
| 6,416,022 | B1 * | 7/2002 | Crespi | F16G 13/16 248/49 |
| 6,494,268 | B1 * | 12/2002 | Ljungdahl | E21B 19/002 166/339 |
| 6,523,790 | B2 * | 2/2003 | Sentpali | F16B 2/12 248/68.1 |
| 6,561,466 | B1 * | 5/2003 | Myers | F16L 3/221 248/68.1 |
| 6,568,836 | B2 * | 5/2003 | Wahl | F21V 21/34 248/298.1 |
| 6,602,016 | B2 * | 8/2003 | Eckart | F16L 3/1033 403/110 |
| 6,637,704 | B2 * | 10/2003 | Jette | H02G 3/0443 248/49 |
| 6,644,602 | B1 * | 11/2003 | Lundstrom | B25J 19/0025 248/49 |
| 6,672,410 | B2 * | 1/2004 | Smith | E21B 19/084 175/122 |
| 6,695,048 | B2 * | 2/2004 | Andersen | E21B 19/22 166/77.1 |
| 6,781,058 | B1 * | 8/2004 | DeCicco | E05D 15/1047 174/72 A |
| 6,902,069 | B2 * | 6/2005 | Hartman | H02G 3/0456 211/26 |
| 7,040,411 | B2 * | 5/2006 | Kainer | E21B 19/00 166/379 |
| 7,216,716 | B2 * | 5/2007 | Cole | E21B 17/026 166/379 |
| 7,222,677 | B2 * | 5/2007 | Webre | E21B 17/026 166/379 |
| 7,246,983 | B2 * | 7/2007 | Zahn | E21B 19/14 414/22.65 |
| 7,308,953 | B2 * | 12/2007 | Barnes | E21B 7/02 175/122 |
| 7,355,120 | B2 * | 4/2008 | Herring | H05K 7/1491 174/481 |
| 7,391,625 | B2 * | 6/2008 | Mendoza | H04Q 1/064 361/826 |
| 7,462,785 | B1 * | 12/2008 | Davis | H02G 3/0443 174/135 |
| 7,469,749 | B2 * | 12/2008 | Folk | E21B 7/02 166/379 |
| 7,497,274 | B1 * | 3/2009 | Randall | E21B 15/003 173/152 |
| 7,584,810 | B1 * | 9/2009 | McKnight, Jr | E21B 15/00 175/162 |
| 7,637,329 | B2 * | 12/2009 | Stoik | E21B 3/02 173/141 |
| 7,828,086 | B2 * | 11/2010 | Lesko | E21B 7/023 175/203 |
| 7,845,398 | B2 * | 12/2010 | Wood | E21B 7/02 166/77.2 |
| 7,878,254 | B2 * | 2/2011 | Abdollahi | E21B 19/14 166/379 |
| 7,886,846 | B2 * | 2/2011 | Pires | E21B 19/146 175/52 |
| 7,918,270 | B2 * | 4/2011 | Schiefelbein, Jr. | E21B 17/1035 166/75.11 |
| 7,967,541 | B2 * | 6/2011 | Stroshein | E21B 19/14 414/22.65 |
| RE42,970 | E * | 11/2011 | Fournier | G02B 6/4452 211/26 |
| 8,056,868 | B2 * | 11/2011 | Vander Griend | F16L 3/1075 248/74.2 |
| 8,061,493 | B2 * | 11/2011 | Kemper | H02G 11/00 191/12 R |
| 8,151,903 | B2 * | 4/2012 | Crawford | E21B 19/24 175/52 |
| 8,177,172 | B2 * | 5/2012 | Quertelet | H02G 3/0443 248/68.1 |
| 8,191,322 | B2 * | 6/2012 | Liestenfeltz | H01Q 1/1235 212/296 |
| 8,261,670 | B2 * | 9/2012 | Takeda | B25J 9/026 105/148 |
| 8,291,551 | B2 * | 10/2012 | Bruss | F16B 7/0433 24/16 R |
| 8,297,405 | B2 * | 10/2012 | Morelli | E21B 41/00 182/82 |
| 8,307,996 | B2 * | 11/2012 | Taylor | H04Q 1/06 211/26 |
| 8,356,660 | B1 * | 1/2013 | Schiefelbein, Jr. | B66C 13/12 166/75.11 |
| 8,397,868 | B1 * | 3/2013 | Ferree | E06C 9/08 182/116 |
| 8,443,916 | B2 | 5/2013 | Connell | |
| 8,584,774 | B2 * | 11/2013 | Connell | E21B 19/24 175/220 |
| 8,596,588 | B1 * | 12/2013 | Sikkema | H02G 3/30 211/70.6 |
| 8,608,239 | B1 * | 12/2013 | Lawson | B60P 3/36 296/208 |
| 8,671,626 | B1 * | 3/2014 | Marty | E21B 19/083 52/117 |
| 8,893,825 | B1 * | 11/2014 | Akerman | E21B 17/07 175/113 |
| 8,967,573 | B2 * | 3/2015 | Hemmer | F21V 21/35 248/323 |
| 8,985,530 | B2 * | 3/2015 | Jette | H02G 3/0443 248/67.7 |
| 9,038,967 | B2 * | 5/2015 | Struck | F16L 57/04 248/68.1 |
| 9,080,336 | B1 * | 7/2015 | Yantis | E21B 19/14 |
| 9,238,945 | B2 * | 1/2016 | Buckingham | E21B 15/006 |
| 9,284,168 | B2 * | 3/2016 | Mau | B66C 23/80 |
| 9,382,685 | B2 | 7/2016 | Maki et al. | |
| 9,464,493 | B2 * | 10/2016 | Andreychuk | E21B 19/22 |
| 9,488,014 | B2 * | 11/2016 | Sparkman | E21B 15/006 |
| 9,488,023 | B2 * | 11/2016 | Vogt | E21B 19/00 |
| 9,520,701 | B2 * | 12/2016 | Winkler | H02G 3/045 |
| 10,113,377 | B2 * | 10/2018 | Flusche | B23P 11/00 |
| 10,225,947 | B2 * | 3/2019 | Jette | H02G 3/0443 |
| 10,370,225 | B2 * | 8/2019 | Miles | B66C 23/62 |
| 10,648,158 | B1 * | 5/2020 | Smith | B60R 16/0215 |
| 10,668,684 | B1 * | 6/2020 | Hilarides | B30B 15/08 |

(56) References Cited

U.S. PATENT DOCUMENTS

| | | | | |
|---|---|---|---|---|
| 2002/0030143 A1* | 3/2002 | Jette | ..................... | H02G 3/0443 248/49 |
| 2003/0161622 A1* | 8/2003 | Zantos | ................... | F16M 11/18 396/419 |
| 2004/0055232 A1* | 3/2004 | Jette | ....................... | H02G 3/285 52/220.1 |
| 2004/0231857 A1* | 11/2004 | Kainer | .................... | E21B 19/00 166/379 |
| 2004/0245411 A1* | 12/2004 | Phelan | ................. | H02G 3/0443 248/49 |
| 2006/0022455 A1* | 2/2006 | Mieger | ................. | E02F 3/3654 285/124.5 |
| 2006/0207767 A1* | 9/2006 | Andreychuk | ........... | E21B 19/22 166/379 |
| 2007/0076403 A1* | 4/2007 | McGrew | ................ | H04Q 1/021 361/825 |
| 2007/0089884 A1* | 4/2007 | Patton | ..................... | E21B 33/06 166/355 |
| 2009/0272540 A1* | 11/2009 | Rodgers | .................. | E21B 19/00 166/377 |
| 2009/0279987 A1* | 11/2009 | Jantzen | ................... | E21B 15/04 414/22.53 |
| 2010/0175950 A1* | 7/2010 | Morelli | .................. | E21B 41/00 182/14 |
| 2010/0213324 A1* | 8/2010 | Holopainen | ............ | B66C 13/12 248/49 |
| 2011/0061313 A1* | 3/2011 | Vos | ..................... | H02G 11/006 52/118 |
| 2011/0147092 A1* | 6/2011 | Connell | ................ | E21C 35/046 175/122 |
| 2011/0162296 A1* | 7/2011 | Benson | ..................... | E21B 7/02 52/116 |
| 2011/0174545 A1* | 7/2011 | Hartke | ....................... | E21B 7/00 175/113 |
| 2012/0018222 A1* | 1/2012 | Hankins | .................. | E21B 19/14 175/57 |
| 2012/0175470 A1* | 7/2012 | Jette | ..................... | H02G 3/0443 248/65 |
| 2013/0082153 A1* | 4/2013 | Palen | .................... | E02F 9/2275 248/75 |
| 2013/0343836 A1* | 12/2013 | Flusche | ................... | E21B 19/15 414/22.55 |
| 2014/0000867 A1* | 1/2014 | Andreychuk | ........... | E21B 17/20 166/77.2 |
| 2014/0013893 A1* | 1/2014 | Asano | .................... | H02G 15/00 74/490.02 |
| 2014/0190714 A1* | 7/2014 | In | ........................... | E21B 19/08 173/31 |
| 2014/0224540 A1* | 8/2014 | Pyorny | .................... | E21B 19/20 175/52 |
| 2015/0034392 A1* | 2/2015 | Taylor | ................... | E21B 21/011 175/209 |
| 2015/0090464 A1* | 4/2015 | Johnston | ................. | E21B 15/02 166/385 |
| 2015/0360363 A1* | 12/2015 | Hohmeier | ................. | E04G 5/00 182/113 |
| 2016/0032689 A1* | 2/2016 | Mignault | .................. | E21B 3/02 175/57 |
| 2016/0168929 A1* | 6/2016 | Magnuson | ........... | E21B 19/083 166/379 |
| 2016/0375281 A1* | 12/2016 | Vetesnik | ................ | A62B 35/04 248/548 |
| 2017/0044875 A1* | 2/2017 | Hebebrand | ......... | E21B 41/0092 |
| 2017/0067303 A1* | 3/2017 | Thiemann | ............... | F01C 21/18 |
| 2017/0081144 A1* | 3/2017 | Upmeier | ............... | B65H 57/14 |
| 2017/0082437 A1* | 3/2017 | Dostinov | .............. | G01C 15/10 |
| 2017/0191319 A1* | 7/2017 | Gonzalez | ................ | E21B 15/00 |
| 2019/0186211 A1* | 6/2019 | Gonzalez Gonzalez | | ..................... E21B 7/046 |
| 2020/0024909 A1* | 1/2020 | Knijpstra | ............... | E21B 7/024 |
| 2020/0115969 A1* | 4/2020 | De Mul | ................ | E21B 3/022 |
| 2020/0115974 A1* | 4/2020 | Hudson | ................... | E21B 7/02 |

FOREIGN PATENT DOCUMENTS

| | | | | |
|---|---|---|---|---|
| FR | 2987855 A1 | * | 9/2013 | ........... H02G 3/0443 |
| GB | 853882 A | * | 11/1960 | ............. B66F 9/205 |
| GB | 2040856 A | | 9/1980 | |

\* cited by examiner

HOSE RETENTION SYSTEM FOR DRILLING MACHINE

TECHNICAL FIELD

The present disclosure relates generally to drilling machines, and more particularly, to a hose retention system for drilling machines.

BACKGROUND

Surface drilling machines may be provided with a mobile frame to facilitate the production of a series of bores. These bores may provide access to subterranean resources or provide a passage for the introduction of explosive devices in a process known as blasthole drilling. To allow drilling to a desired depth, surface drilling machines include a mast that is movable from an approximately horizontal position to an approximately vertical position. When at a vertical position, a drill supported by the mast drills into the earth and rock and produces a bore. When used for blasthole drilling, a series of blastholes are created at a suitable depth within rock. Detonation of explosives placed in these blastholes causes the surrounding rock to collapse, allowing for removal of the detonated rock, and continued excavation and/or construction.

Drill string components employed in blasthole drilling machines may be brought into motion by a rotary motor or rotary head mounted to, and movable along, the mast. Such motors may be fluid driven, such as by hydraulic fluid. Pneumatic tools may be employed at the end of the drill string, requiring pressurized air. Furthermore, water or other irrigating fluid can be provided through the drill string to the bore to assist in the removal of drilled material during the production of the blasthole. Therefore, blasthole drilling machines may include three or more fluid lines conveyed through the vertically moving and rotating drill string: hydraulic fluid, pressurized air, and water. These fluid lines may include hoses that connect to the rotary head, and thus these hoses move with the vertical movement of the rotary head. While these moving fluid hoses may be adequately secured relative to the mast when the mast is oriented vertically, problems may arise if the blasthole drilling machines include masts that are capable of drilling at a negative angle. For example, gravity may urge the fluid hoses to interfere with other components of the blasthole drilling machine, interfering with the operation of the drilling machine and potentially damaging the hoses and/or other components of the blasthole drilling machine. Furthermore, as the fluid hoses themselves may move laterally with the movement of the motor and drill string, the risk of damage due to drooping hoses may increase as bending occurs in the hoses. Another problem is an increased risk to the operator of the blasthole drilling machine and any workers present in the vicinity of the hoses.

U.S. Pat. No. 4,190,119, issued to Loftis et al. ("the '119 patent"), describes an earth drilling apparatus. The '119 patent discloses drilling fluid supplied to the drill bit through a supply hose which is connected to a fluid connector located on the upper end of a drill string. The '119 patent also discloses a fluid hose and associated connector attached to the top of the string. The supply hose disclosed in the '119 patent is freely suspended from this connector.

The present disclosure may solve one or more of the problems set forth above and/or other problems in the art. The current scope of the disclosure, however, is defined by the attached claims and not by the ability to solve any specific problem.

SUMMARY

In one aspect, a hose retention system for a negative-angle-capable blasthole drilling machine is disclosed. The hose retention system may comprise: an upper cage to extend longitudinally along a mast structure, the upper cage having a secured end to couple the upper cage to the mast structure, a free end to extend toward the mast structure, and a first longitudinally-extending channel; and a lower cage separate from the upper cage to extend longitudinally along the mast structure, the lower cage having a secured end to couple the lower cage to the mast structure, a free end to extend toward the mast structure, and a second longitudinally-extending channel In another aspect, a hose retention system for a negative-angle-capable blasthole drilling machine is disclosed. The hose retention system may comprise: a cage to extend longitudinally along a mast structure, the cage including: a secured end to couple the cage to the mast structure; a free end to extend toward the mast structure; a longitudinally-extending channel; and a hose retaining wall forming an enclosure on at least a portion of the channel.

In yet another aspect, a hose retention system for a negative-angle-capable blasthole drilling machine is disclosed. The hose retention system may comprise: a mast structure; an upper cage extending longitudinally along the mast structure, the upper cage having a secured end coupling the upper cage to the mast structure, a free end extending toward the mast structure, and a first longitudinally-extending channel to support a plurality of hoses; and a lower cage separate from the upper cage and extending longitudinally along the mast structure, the lower cage having a secured end coupling the lower cage to the mast structure, a free end extending toward the mast structure, and a second longitudinally-extending channel to support a plurality of hoses.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," "generally," and "approximately" are used to indicate a possible variation of ±10% in a stated value or characteristic.

Figure 1:
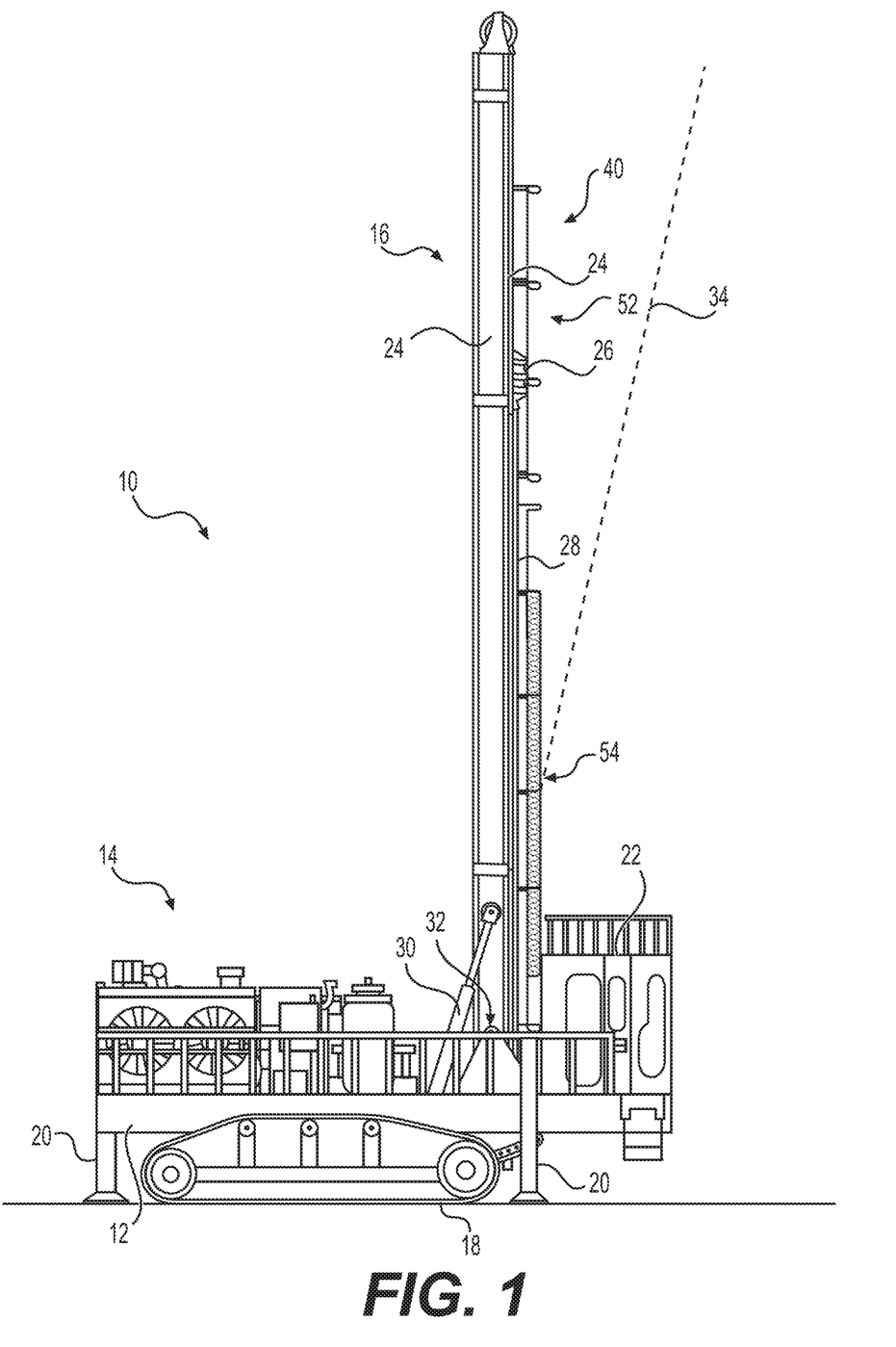
FIG. 1 is a schematic side view of an exemplary mobile drilling machine having a hose retention system according to aspects of the disclosure.

FIG. 1 illustrates a schematic side view of an exemplary drilling machine 10. The disclosure herein is applicable to any type of drilling machine. However, reference will be made below to a mobile blasthole drilling machine. As shown in FIG. 1, mobile drilling machine 10 may include a frame 12, a machinery housing 14, and a drilling mast 16. Frame 12 may be supported on a ground surface by a transport mechanism, such as crawler tracks 18. Crawler tracks 18 may allow mobile drilling machine 10 to maneuver about the ground surface to a desired location for a drilling operation. In one aspect, a set of wheels and tires may be used in place of or in addition to crawler tracks 18.

Frame 12 may further include one or more jacks 20 for supporting and leveling mobile drilling machine 10 on the ground surface during a drilling operation. Frame 12 may support the machinery housing 14, which may house motors, engines, batteries, compressors, pumps, hydraulic systems, electronics, and any other equipment necessary to power and operate mobile drilling machine 10. Frame 12 may further support an operator cab 22, from which an operator may maneuver and control mobile drilling machine 10.

As further shown in FIG. 1, drilling mast 16 includes a mast body 24 which may support a movable drill motor assembly or rotary head 26. The rotary head 26 may support a drill string 28 on which a drill bit (not shown) is mounted for drilling into the ground surface. The drill string 28 may also include one or more pneumatic tools (not shown), such as a hammer requiring supply of pressurized air to the drill bit. Further, drill string 28 may include one or more fluid passageways (not shown) for conveying a supply of cooling and/or irrigating fluid to the drill bit. Drilling mast 16 may be any suitable mast capable of supporting a rotary head 26 and drill string 28. A pair of hydraulic cylinders 30 (only one shown in FIG. 1) may be connected to frame 12 and to drilling mast 16 at a lower portion thereof. Hydraulic cylinders 30 may be pivotally connected to frame 12 and to drilling mast 16 to raise and lower drilling mast 16.

In addition to the vertical position illustrated in FIG. 1, drilling mast 16 is capable of movement about a mast pivot 32 to a negative angle, for example, to an angle represented by dashed line 34 in FIG. 1. Such negative angle movement may, for example, be in the range of 5 to 15 degrees from vertical in the direction of operator cab 22.

Figure 2:
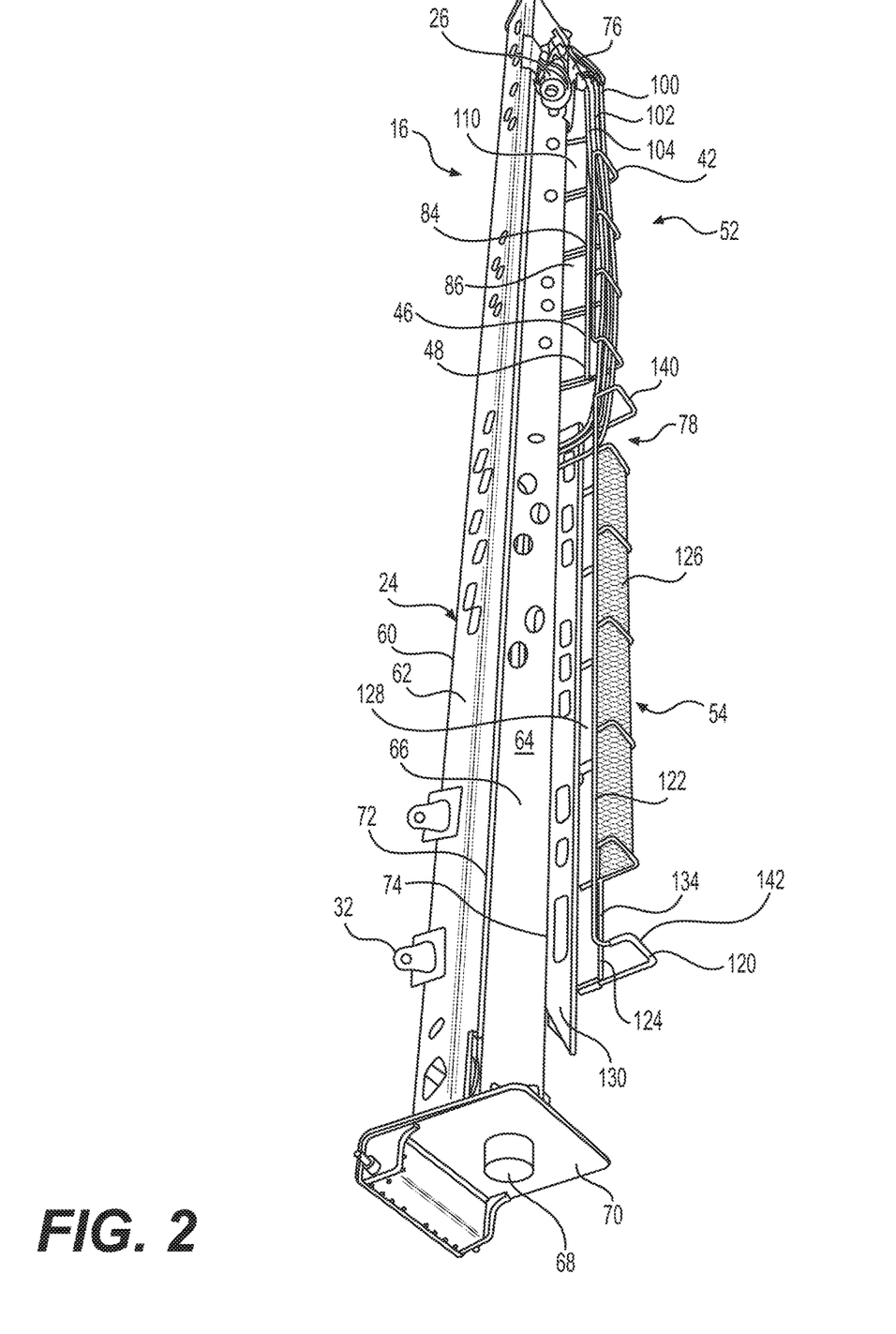
FIG. 2 is a perspective view of the hose retention system of FIG. 1.

Blasthole drilling machine 10 may also include a hose retention system 40 coupled to a side of the mast 16. The hose retention system 40 may include an upper cage 52 and a separate lower cage 54, both of which extend longitudinally along a same side of drilling mast 16. For example, the hose retention system 40 may extend from a position at or immediately above mast pivot 32 to a position corresponding to at least 75% of the height of drilling mast 16 as measured from a mast deck 70 (FIG. 2). When drilling mast 16 is in a non-horizontal orientation, such as the horizontal position of FIG. 1, upper cage 52 is located above lower cage 54. In one aspect, hose retention system 40 can include mast 16, connector plate 76, and rotary head 26.

FIG. 2 illustrates a perspective view of portions of the drilling mast 16 and the hose retention system 40. Various aspects of the drilling mast 16 are omitted for clarity. As shown, a mast structure or mast body 24 may include a back portion 60, and sides 62, 64 diverging from back portion 60 to form a mast front opening 66 facing the cab end of drilling machine 10. Thus, mast body forms a generally "C" or "V" shape. Rotary head 26, drill string (not shown in FIG. 2), and a rotary head driving system (not shown) may be received within the opening 66 of mast body 24. The drill string may extend through a hole 68 in the mast deck 70. For example, rotary head 26 may be movably connected to slide on rails 72, 74 located at the free end of sides 62, 64 of mast body 24.

Rotary head 26 may be a juncture for receiving a plurality of fluid lines. For example, rotary head may include a fluid motor that receives a supply of hydraulic fluid via one or more fluid lines or hoses 100. One or more pneumatic tools may be provided at an end of drill string 28 in the vicinity of the drill bit to receive a supply of pressurized air. Pressurized air for the pneumatic tool(s) may be provided to the top of the drill string 28 by one or more fluid lines or hoses 102 that extend to rotary head 26. In addition to the above-described hoses 100 and 102, one or more hoses 104 may connect to rotary head 26 to supply irrigating and/or cooling fluid such as water to the drill string 28. A hose-connecting plate or bulkhead 76 may be secured to rotary head 26 and extend to a side of mast 16 to provide a securing point for hoses 100, 102, 104. Each of the hoses 100, 102, and 104 may also be fixedly secured at an intermediate portion 78 of mast body 24. From this intermediate portion 78, hoses 100, 102, and 104 each are fixedly secured to connector plate 76, and subsequently proceed to rotary head 26. It is understood that more or less hoses may be included without departing from this disclosure.

Figure 3:
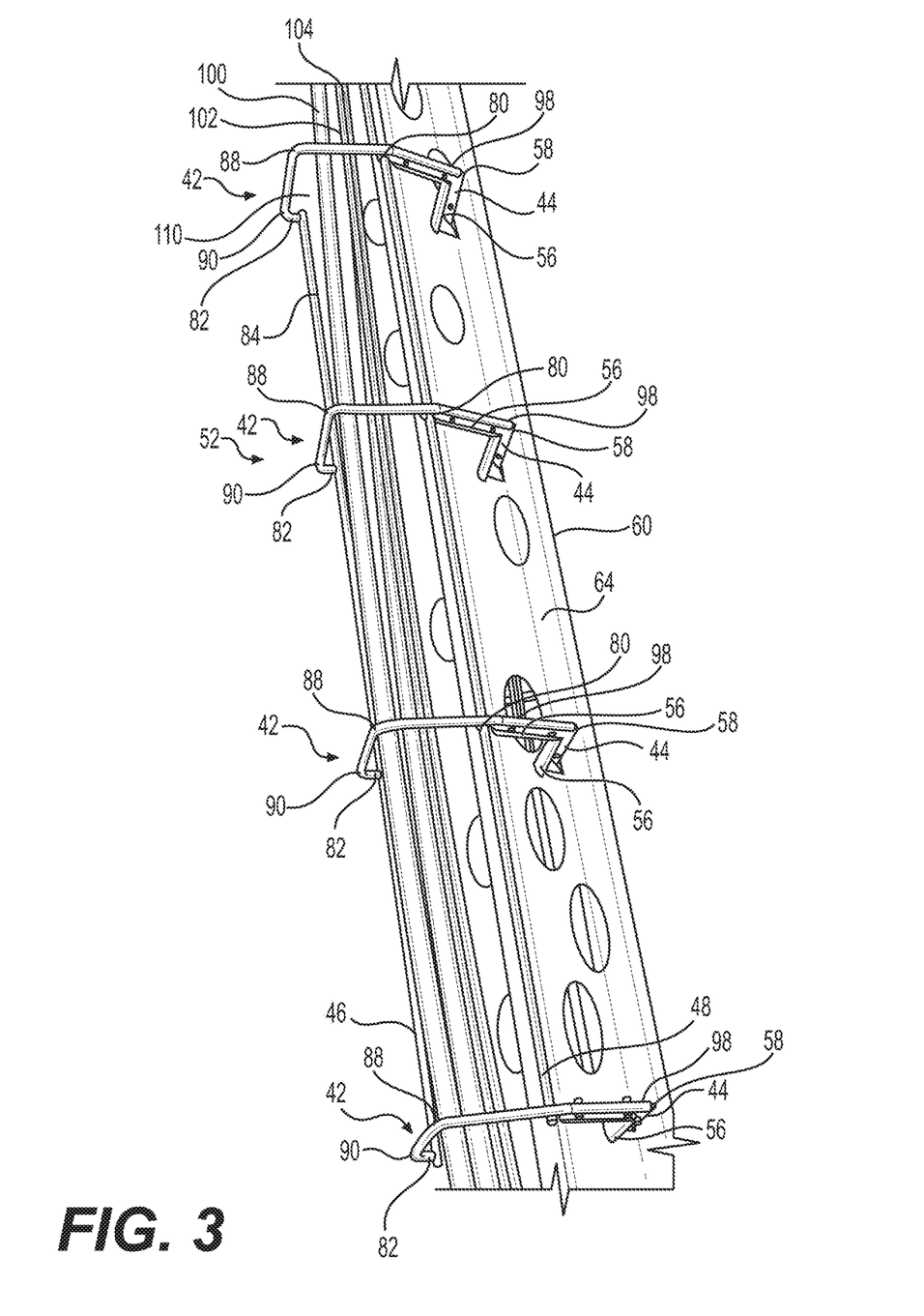
FIG. 3 is a perspective view of an upper cage assembly of the hose retention system of FIG. 1.

Referring to FIGS. 2 and 3, upper cage 52 may include a series of arm members 42 extending from a bracket 44 coupled to the mast side 64 to form a secured end 98 of upper cage 52. In one aspect, upper cage 52 may include four arm members 42, however, more or less arm members 42 may be used. A series of longitudinally extending rails, for example a upper rail 46 and lower rail 48 may extend between and form a cage with arm members 42. The arm members 42 and rails 46, 48, with mast side 64, may form an upper channel 110 enclosing hoses 100, 102, and 104. Arm members 42, upper rail 46, and lower rail 48, may be formed of steel. However, other appropriate materials may be used to construct arm members 42, upper rail 46, and lower rail 48, in place of or in addition to steel.

Bracket 44 may be fixedly secured to mast side 64, for example, by welding or the like. Bracket 44 may be generally "L" shaped to extend away from mast side 64, and turn to extend toward the front of mast 16. Brackets 44 may be formed of steel or the like and may include rounded plates 56 secured to the inside of the brackets 44 to form guards to protect the hoses 100, 102, and 104 from rubbing against sharp edges of the bracket 44. The bracket 44 may be formed of one piece or more than one pieces. Arm members 42 may be fixedly secured to a back portion of bracket 44, for example by welding or the like. In particular, bracket 44 may include a back flange 58 forming an abutment for an end of arm member 42. Thus, bracket 44 may form a secured end 98 of upper cage 52. Bracket 44 may also include a cutout 80 for receiving lower rail 48. Lower rail 48 may be fixedly secured to bracket 44 by welding or the like.

Arm members 42 may have a generally hook or "J" shape. For example, arm members 42 may extend from bracket 44 in a forward direction (a direction from mast back portion 60 toward mast front opening 66) and extend forward of a forward end of mast body 24. Arm members 42 may then transition at a bend 88 to extend in a generally lateral direction back toward the mast body 24. Bend 88 may for an angle of about 90 degrees. Finally, arm members 42 may include another bend 90 and extend in a rear direction back toward the mast body 24 to a free end 82 of the arm members 42. Bend 90 may form an angle of about 90 degrees and may be disposed in the same plane as bend 88. Upper rail 46 may be fixedly secured to the free ends 82 of arm members 42, such as by welding or the like, to form a free end 84 of the upper cage 52. The free end 84 of upper cage extends in front of, and laterally within the mast front opening 66, and forms a gap 86 with flange 74 of mast side 64 to allow the rotary head 26 to travel along mast body 24. Further, the upper cage 52 is shaped so that connector plate 76 of rotary head 26 may ride within upper cage 52 during motion of rotary head 26 up and down mast body 24.

Figure 4:
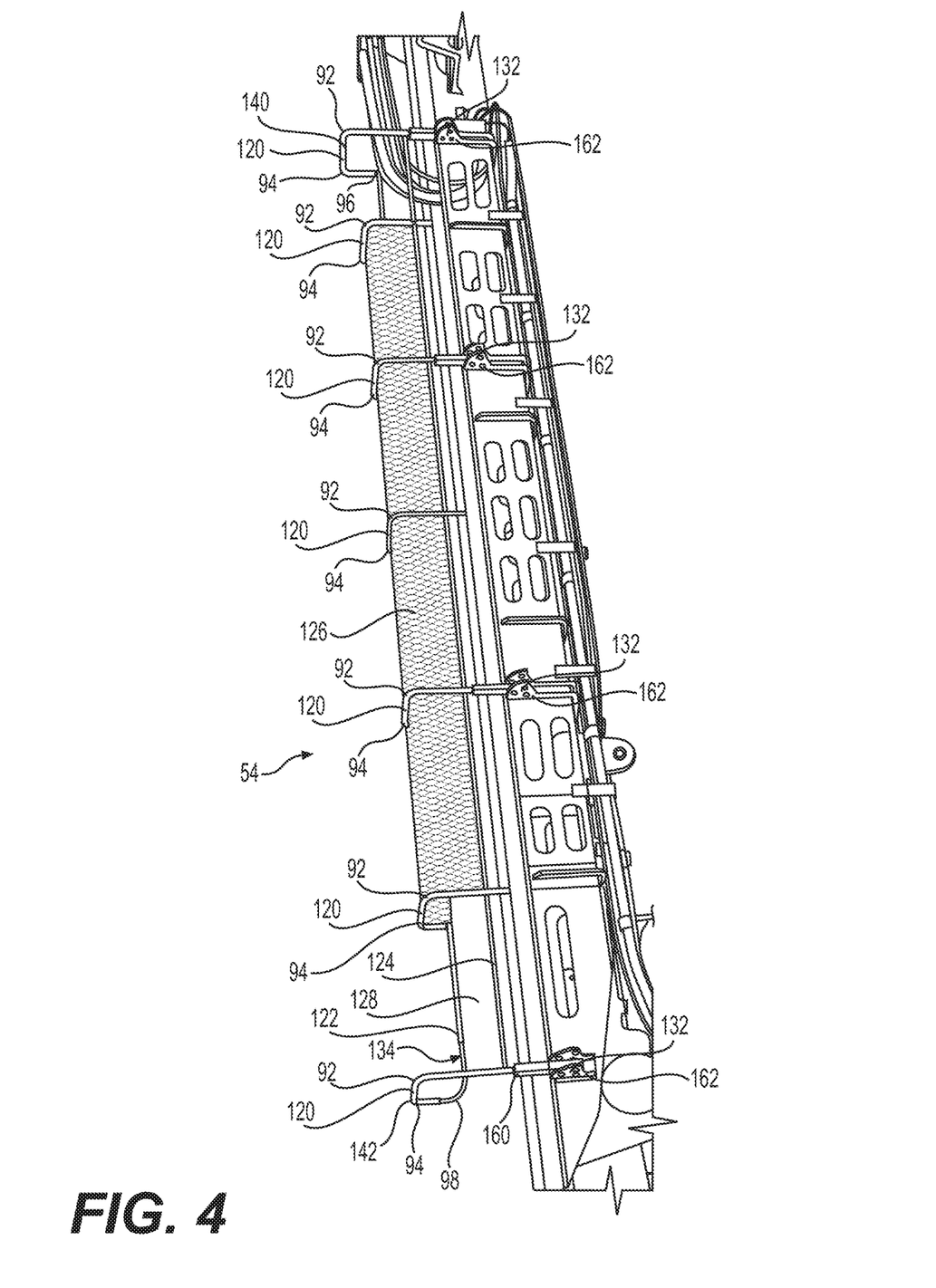
FIG. 4 is a perspective view of a lower cage assembly of the hose retention system of FIG. 1.

FIGS. 2 and 4 will now be referenced to discuss lower cage 54. Lower cage 54 may include a series of arm members 120 that together with upper rails 122, lower rails 124, and a retention mesh 126 provide a shape that defines a lower channel 128 extending longitudinally along mast body 24. Lower channel 128 of lower cage 54 forms an enclosure for hoses 100, 102, 104 when the rotary head moves down the mast body 24.

As shown in FIG. 4, a secured end 162 of lower cage 54 may be formed by joints 132 connected to mast body 24 at a hose tray 130. As will be described in more detail with respect to FIG. 5, joint 132 is fixedly secured to hose tray 130 and provides a pivoting connection to lower cage 54 to allow lower cage 54 to move from a first or hose retention position to a second or maintenance position. Lower cage 54 may be secured to hose tray 130 via four joints 132, as shown, however more or less joints 132 may be used.

The arm members 120 of lower cage 54 may have a generally hook or "J" shape. For example, arm members 120 may extend from joint 132 in a forward direction (a direction from mast back portion 60 toward mast front opening 66), and extend forward of a forward end of mast body 24. Arm members 120 may then include a bend 92 and extend in a generally lateral direction back toward the mast body 24. Bend 92 may form an angle of about 90 degrees. Finally, arm members 120 may include another bend 94 and extend in a rear direction back toward the mast body 24 to a free end of the arm members 120. Bend 94 may form an angle of about 90 degrees and may be disposed in the same plane as bend 92. Lower cage 54 may include seven arm members as shown, however more or less arm members 120 can be used. Also, the upper-most and lower-most arm members 140, 142 may extend more forward or taller than the other arm members 120 to allow for more forward movement or bend of the hoses 100, 102, 104. Upper-most and lower-most arm members 140, 142, may include an additional bend 96 at the longitudinal ends of upper rail 122 that provides a transition to upper rails 122 of lower cage 54. Bend 96 may form an angle of approximately 90 degrees.

Longitudinally-extending rail members or upper rails 122 of lower cage 54 may be fixedly secured to the free ends of arm members 120, such as by welding or the like, to form a free end 134 of the lower cage 54. The free end 134 of lower cage extends in front of, and laterally within the mast front opening 66, and forms a gap 136 with flange 74 of mast side 64. Lower rails 124 of lower cage 54 may be fixedly secured to arm members 120 adjacent and above joints 132. Upper and lower rails 122, 124 of lower cage 54 may extend the entire length of the lower cage 54. Arm members 120, upper rail 122, and lower rail 124, may be formed of steel. However, other appropriate materials may be used to construct arm members 120, upper rail 124, and lower rail 124, in place of or in addition to steel.

The hose retaining wall or retention mesh 126 may extend between some or all of the arm members 120 of lower cage 52. For example, retention mesh 126 may extend along a central portion of the lower cage, and be omitted at the upper and lower ends of the lower cage 54. For example, retention mesh 126 may be omitted between the upper-most arm member 140 and the neighboring or immediately adjacent lower arm member 120, and be omitted from lower-most arm member 142 and the neighboring or immediately adjacent upper arm member 120. By omitting the retention mesh 126 in these upper and lower ends of the lower cage 54, more forward movement or bend of the hoses 100, 102, 104 may be permitted. Retention mesh 126 may provide a blocking surface that is free of sharp edges and allows for visibility to the hoses 100, 102, 104. Thus, retention mesh 126 forms an additional enclosure of lower channel 128 of the lower cage 54. The retention mesh 126 can be formed of steel, or any other appropriate material. While a mesh is described, other suitable materials may be used that provide the strength to block the hoses 100, 102, 104 and openings to allow visibility to the hoses 100, 102, 104. Alternatively, retention mesh 126 could be formed with a solid, transparent or opaque material.

Retention mesh may extend from upper rails 122 to lower rails 124. Retention mesh follows bends 92 and 94 of arm members 120 to surround lower channel 128 on three sides. It is understood, however, the retention mesh 126 may extend over less than this area.

Figure 5:
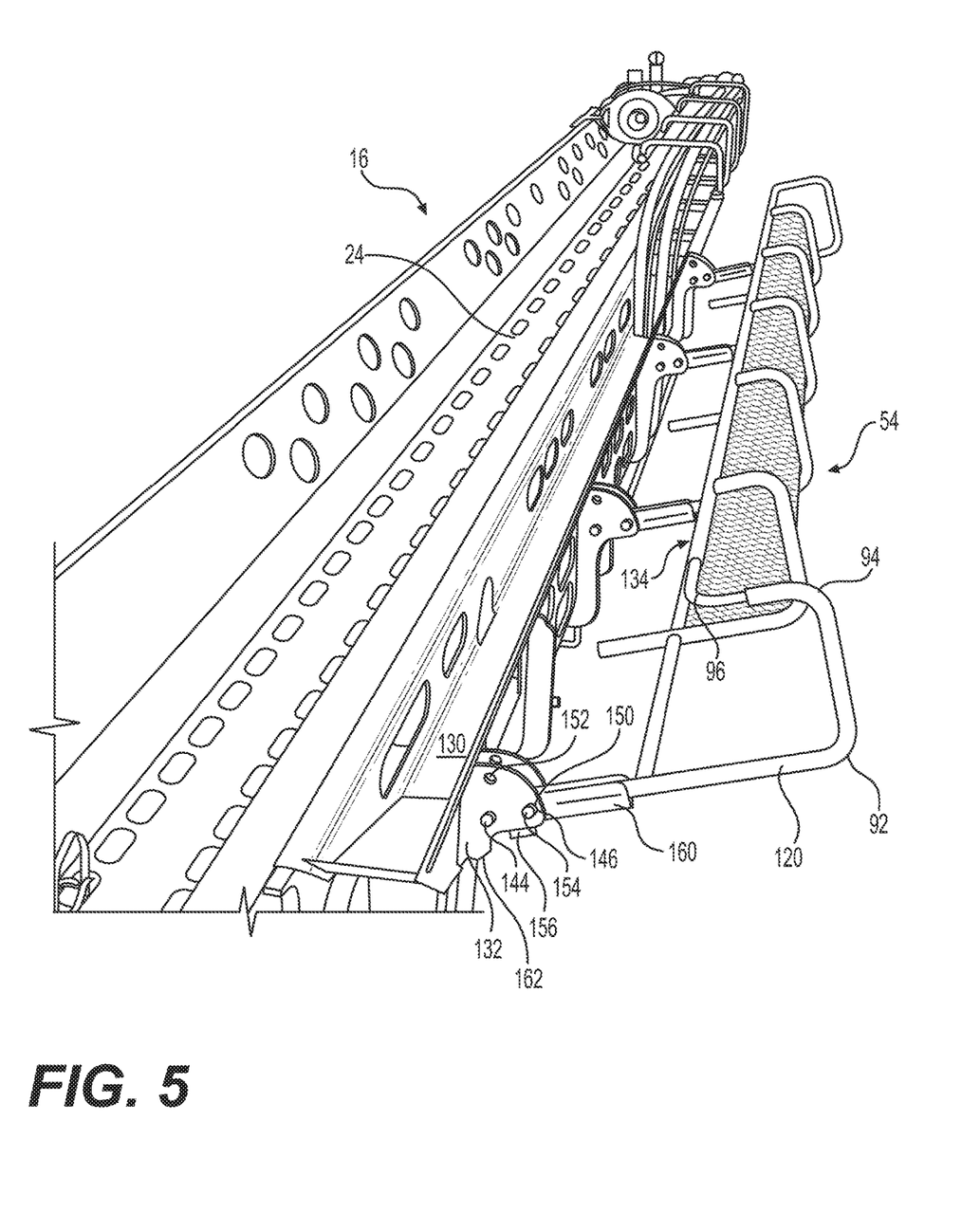
FIG. 5 is a perspective view of the lower cage assembly pivoted to a maintenance position according to aspects of the disclosure.

FIG. 5 illustrates a perspective view of a portion of mast body 24 and lower cage 54 of hose retention system 40. Lower cage 54 is shown pivoted to the maintenance position. As can be seen in FIG. 5, joints 132 receive a sleeve 160 that is fixedly coupled to arm members 120. Sleeves 160 are pivotably attached to joints 132 at pins 144, and sleeves may include a locking bore 146 that can align with each of two locking holes 150 and 152 of joints 132. Thus, joints 132 allows lower cage 54 to pivot and be locked by a locking pin 154 between the hose retention position and the maintenance position (FIG. 5) that allows access to the hoses 100, 102, 104 in hose tray 130 when the rotary head 26 is in a lower position. In one aspect, joints 132 can provide a range of motion of at least 90 degrees. Joints 132 may also include a back plate 156 that forms a stop for opening movement of lower cage 54. For example, back plate 156 can prohibit movement of lower cage 54 to approximately 90 degrees from the hose retention position. It is understood that joint 132 could include additional locking holes for additional locking positions, and the locking plate could be positioned for different opening angles.

INDUSTRIAL APPLICABILITY

The hose retention system 40 disclosed herein may be applied to any drilling machine that employs one or more hoses or cables during operation. For example, the hose retention hose retention system 40 disclosed herein may help to improve the retention and security of hoses during drilling operations, particularly during negative angle drilling operations, thereby improving the durability and safety of the blasthole drilling machine.

During a drilling operation, hoses 100, 102, 104, respectively provide pressurized air, hydraulic fluid, and cooling or irrigation fluid. As illustrated in FIG. 2, rotary head 26 and connecting plate 76 are secured to an upper portion of drilling mast 16 at the beginning of the drilling operation. Similarly, hoses 100, 102, and 104 are retained within upper channel 110 of upper cage 52 by the support of arm members 42. As portions of hoses 100, 102, and 104 located between intermediate portion 78 and connecting plate 76 move downward during the drilling operation, movement of these portions of hoses 100, 102, and 104 is guided by upper channel 110, which forms two side walls and a rear wall, while remaining open via gap 136 in a fourth direction adjacent wall 76.

As the drilling operation proceeds, rotary head 26 moves longitudinally along rails 72, 74 of mast body 24 toward lower cage 54. The descent of rotary head 26 during the drilling operation, allows drill string 28 and the drill bit to produce a bore. This motion draws connecting plate 76 and the moving portions of hoses 100, 102, and 104 in a direction toward lower cage 54. In particular, connecting plate 76 enters and moves downward through upper channel 110.

With continued reference to FIG. 2, the lower channel 128 of lower cage 54 is longitudinally aligned with upper channel 110 of upper cage 52, allowing lower cage 54 to receive each of the moving portions of hoses 100, 102, 104, as these portions descend with connecting plate 76 and rotary head 26. Retention mesh 126 provides a surface that prevents damage to the hoses 100, 102, and 104, while guiding and retaining the hoses 100, 102, and 104 in a generally downward direction. Retention mesh 126 is formed of a sufficiently strong material to resist a force applied by one or more of the hoses 100, 102, and 104. Thus, hoses 100, 102, and 104 cannot exit between individual arm members 120 of lower cage 54. Thus, even as hoses 100, 102, and 104 are provided with sufficient slack to enable a considerable range of motion for rotary head 26, hoses 100, 102, and 104 are prevented from forming bends and from exiting lower channel 128. Hoses 100, 102, 104 are thereby also prevented from entering the front opening 66.

At the conclusion of a drilling operation, rotary head 26, connecting plate 76, and hoses 100, 102, and 104 are drawn upwards to return the position illustrated in FIG. 2. During this motion, the arm members 42 and rails 46, 48, with mast side 64 that together form upper channel 110, prevent hoses 100, 102, and 104 from forming bends or from exiting upper channel 110.

Thus, upper channel 110 and lower channel 128 guide and retain hoses 100, 102, and 104 before, during, and after a drilling operation. Furthermore, as mobile drilling machine 10 is capable of negative angle drilling, both lower channel 128 and upper channel 110 include arm members 42, 120 that form support surfaces for hoses 100, 102, and 104 when drilling mast 16 is disposed at a negative angle. For example, were drilling mast 16 to pivot to a position 34 in FIG. 1 forming a negative angle, gravity would tend to cause hoses 100, 102, and 104 to potentially interfere with machine frame 12, cab 22, drilling mast 16, rotary head 26, and/or drill string 28. However, upper and lower cages 52, 54 prevent such motion. Furthermore, the arm members 42, 120 provide support for hoses 100, 102, and 104 against gravity, avoiding sag and bending of these hoses. Additional support is provided by retaining mat 126.

During maintenance of mobile blasthole drilling machine 10, i.e. when the mast 16 is in a horizontal position and the rotary head 26 is adjacent the lower cage 54, lower cage 54 may be pivoted from the hose retention position illustrated in FIGS. 2 and 4 to the maintenance position illustrated in FIG. 5. Prior to maintenance, when lower cage 54 is in the hose retention position, lower channel 128 and upper channel 110 are in longitudinal alignment with each other. However, when lower cage 54 is pivoted to the maintenance position, lower channel 128 and upper channel 110 are brought out of longitudinal alignment with each other due to the movement of arm members 120 of lower cage 54.

To bring lower cage 54 to the maintenance position, a fastener such as a locking pins 154 is removed from the locking holes 152 corresponding to the hose retention position of lower cage 54. With the pins removed from the locking holes 152 of each joint 132, lower cage 54 is freely pivotable to the maintenance position. Once in the maintenance position, the locking pins 154 are inserted into the set of locking holes 150 corresponding to the maintenance position and through the corresponding holes 146 of sleeves 160 of lower cage 54.

With lower cage 54 in the maintenance position and hoses 100, 102, and 104 drawn toward a lower portion of drilling mast 16, for example, within hose tray 130, an operator has significantly improved access to the hoses 100, 102, and 104. Thus, an operator is able to perform visual inspection and repair without the need to remove either lower cage 54 or upper cage 52.

The hose retention device and system disclosed herein may improve hose stability and control by providing a longitudinally-extending channel to prevent hoses from moving freely. Thus, the hoses are supported against gravity during a negative-angle drilling operation, and will not cause damage to the blasthole drilling machine. Risk to the operator is also eliminated. Additionally, the ability of the lower cage to pivot improves the ability of an operator or technician to access one or more hoses for maintenance or repair.

It will be apparent to those skilled in the art that various modifications and variations can be made to the disclosed device without departing from the scope of the disclosure. Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A hose retention system for a negative-angle-capable blasthole drilling machine, comprising:
   a cabin;
   a mast structure positionable beyond a vertical orientation towards the cabin for performing a drilling operation;
   an upper cage extending longitudinally along the mast structure, the upper cage having a plurality of spaced apart arm members, a secured end coupled to the mast structure, a free end extending toward the mast structure, and a first longitudinally-extending channel, each of the arm members being secured to a first side of the mast structure to form the secured end and extending continuously from the secured end at the mast structure to the free end, the free end overlapping a second side of the mast structure; and
   a lower cage secured separate from the upper cage on the mast structure so as to extend longitudinally along the mast structure and longitudinally spaced from the upper cage, the lower cage having a secured end that couples the lower cage to the mast structure, a free end that extends toward the mast structure, and a second longitudinally-extending channel.

2. The hose retention system of claim 1, wherein each arm member of the plurality of spaced apart arm members includes an approximately L-shaped bracket that forms a part of the secured end of the upper cage.

3. The hose retention system of claim 1, wherein each arm member of the plurality of spaced apart arm members includes an approximately J-shaped arm portion that forms a part of the first longitudinally-extending channel.

4. The hose retention system of claim 1, wherein the free end of the upper cage includes a longitudinally-extending rail member.

5. The hose retention system of claim 1, wherein the first longitudinally-extending channel is sized to receive a hose-connecting plate of a rotary head.

6. The hose retention system of claim 1, wherein the secured end of the upper cage includes a plurality of longitudinally-spaced apart end portions of the plurality of spaced apart arm members that are secured to the mast structure, and wherein the secured end fixes the upper cage in a stationary position.

7. The hose retention system of claim 1, wherein the free end of the upper cage extends laterally from the secured end to overlap an opening of the mast structure defined in part by the second side of the mast structure.

8. The hose retention system of claim 1, further comprising a frame that supports the cabin and the mast structure, the mast structure having a pivot secured to a base portion of the mast structure,
wherein the pivot connects the base portion of the mast structure to the frame and enables the mast structure to move from the vertical orientation, where a vertical axis defined by the mast structure overlaps the frame, to a position beyond the vertical orientation towards the cabin.

9. A hose retention system for a negative-angle-capable blasthole drilling machine, comprising:
a cabin;
a mast structure that, during a drilling operation, is configured to be positioned at an orientation that forms an acute angle with the cabin when the negative-angle-capable blasthole drilling machine is viewed from a side; and
a cage to extend longitudinally along a mast structure, the cage including:
a secured end to couple the cage to the mast structure;
a free end to extend toward the mast structure;
a longitudinally-extending channel; and
a hose retaining wall forming an enclosure on at least a portion of the longitudinally-extending channel, the hose retaining wall extending from the free end toward the secured end and having three sides that enclose the longitudinally-extending channel between a plurality of arm members that each extend from the secured end toward the free end, wherein the hose retaining wall includes a mesh material extending along the three sides that enclose the longitudinally-extending channel.

10. The hose retention system of claim 9, wherein the longitudinally-extending channel extends from an upper arm member of the cage to a lower arm member of the cage, and the hose retaining wall terminates at a position lower than the upper arm member.

11. The hose retention system of claim 9, wherein the longitudinally-extending channel extends from an upper arm member of the cage to a lower arm member of the cage, and the upper arm member forms a taller portion of the longitudinally-extending channel as compared to a neighboring arm member of the cage.

12. The hose retention system of claim 9, wherein the cage includes a longitudinally-extending rail member.

13. The hose retention system of claim 9, wherein the cage includes a joint such that the cage is pivotal between a first position and a second position.

14. The hose retention system of claim 13, wherein the joint provides a range of motion of at least 90 degrees.

15. The hose retention system of claim 13, wherein the joint is selectively lockable at the first position and at the second position.

16. A hose retention system for a negative-angle-capable blasthole drilling machine, comprising:
a cabin;
a mast structure positionable beyond a vertical orientation towards the cabin;
an upper cage extending longitudinally along the mast structure, the upper cage having a secured end coupling the upper cage to the mast structure, a free end extending toward the mast structure, and a first longitudinally-extending channel to support a plurality of hoses; and
a lower cage separate from the upper cage and extending longitudinally along the mast structure, the lower cage having a secured end coupling the lower cage to the mast structure, a free end extending toward the mast structure, and a second longitudinally-extending channel to support the plurality of hoses when the mast structure is positioned beyond the vertical orientation during a drilling operation, the lower cage including a joint at the secured end of the lower cage such that the lower cage is pivotal between a first position for retaining the plurality of hoses where the first longitudinally-extending channel and the second longitudinally-extending channel are aligned and the free end of the lower cage covers a hose retaining structure of the mast structure, and a second position where the first longitudinally-extending channel and the second longitudinally-extending channel are offset and the free end of the lower cage is spaced away from the hose retaining structure such that the hose retaining structure is uncovered.

17. The hose retention system of claim 16, further comprising the plurality of hoses; wherein the plurality of hoses are secured to a portion of the mast structure adjacent to an upper end of the lower cage.

18. The hose retention system of claim 16, further comprising the plurality of hoses; wherein the hose retention system includes a fluid motor that receives the plurality of hoses and that is slidable between a first motor position and a second motor position, and the upper cage is configured to support the plurality of hoses when the fluid motor is disposed in the first motor position.

19. The hose retention system of claim 18, wherein the lower cage is configured to support the hoses when the fluid motor is in the second motor position.

* * * * *